July 14, 1942.
J. C. OWENS
2,290,145
SIPHONIC VALVE AND THE LIKE
Filed June 17, 1940
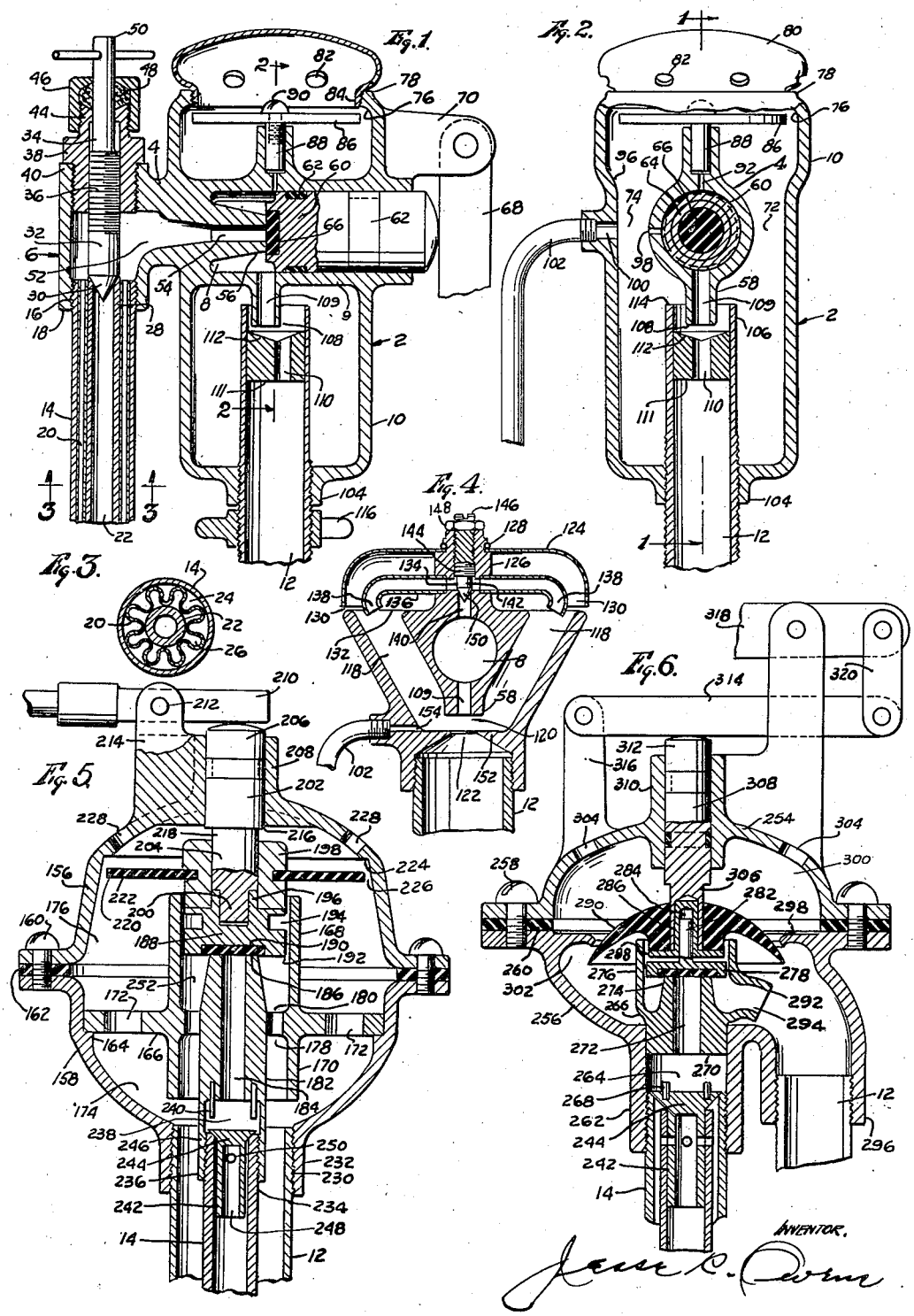

Patented July 14, 1942

2,290,145

UNITED STATES PATENT OFFICE 2,290,145

SIPHONIC VALVE AND THE LIKE

Jesse C. Owens, Los Angeles, Calif.

Application June 17, 1940, Serial No. 340,934

1 Claim. (Cl. 137—69)

My invention relates to anti-siphonic valves and more particularly to devices which are especially used for controlling the fluid flow therethrough such as water, and particularly adapted for controlling and preventing the fluid contamination when the valve passage is closed by allowing the air to pass through the outlet pipe of said valve and thereby preventing any siphonic movement and backward action of the water through said valve and into the main inlet water pipe.

Accordingly my invention relates to an anti-siphonic valve which comprises in combination a water controlling means and the suitable anti-siphonic means which is connected therewith for controlling the water flowing therethrough and thereby by means of the action of said anti-siphonic means preventing the contamination of water passing through and from the inlet pipe of said valve.

Another object of my invention is to provide the inlet pipe of said valve with suitable silencing means which is adjustably positioned therein and which in operation will eliminate any and all water noises which are present and emanating therefrom, when said valve is in operation.

Further object of my invention is to provide said valve with a combination of an air chamber and fluid silencing means, having an adjustable water outlet passage associated therewith which controls the volume of water accumulating in said air chamber and thereby silences the noise caused by the fluid passing therethrough and in addition, prevents the siphoning of fluid into the inlet water pipe when said valve is open.

Other and further objects and advantages of my invention as will hereinafter more fully appear, I attain by the construction herein shown on the drawing and described in the specification, forming a part of my application.

Reference is had to the accompanying drawing in which the similar reference characters denote the similar parts.

In the drawing:

Fig. 1 is the vertical cross-sectional view of the novel type of the valve, having an anti-siphonic chamber, water inlet and a water silencer, taken in the direction of the lines 1—1, of the Fig. 2.

Fig. 2 is the partially fragmentary and the vertical cross-sectional view of the valve, taken on the line 2—2 of the Fig. 1.

Fig. 3 is the transverse cross-sectional view, slightly enlarged, showing the construction of the water inlet silencer, taken on the line 3—3 of the Fig. 3.

Fig. 4 is the vertical cross-sectional view of the valve anti-siphonic chamber, shown in modified form, adapted to be used in place of the air chamber, as shown in Fig. 1.

Fig. 5 shows the vertical cross-sectional view of a modified form of the anti-siphonic valve, showing the water inlet passage including its control, also the discharge passage and the air passages associated therewith, for controlling and preventing the siphonic action of the water therein.

Fig. 6 shows the vertical cross-sectional view of a modified form of the anti-siphonic valve, showing the inlet water passage and its control, also a discharge passage leading into its discharge pipe which inter-connects with the air passages, for controlling the siphonic action therein.

Describing my invention more in detail, said invention comprises a valve generally designated by numeral 2, which consists of a housing 4 comprising an inlet section 6 and the inlet control chamber 8 which is disposed parallel to and within a suitable cross connecting boss 9 and which is partially surrounded by an accumulating chamber 10 to which the discharge pipe 12 is attached, as shown.

Said inlet section 6 of said housing 4 is provided with an inlet tube 14, the upper end 16 of which is screwed into or otherwise attached to the inlet boss 18, the center section of which is provided with a corrugated diffuser 20 which surrounds a central inlet pipe 22 and thereby forms a plurality of outer and inner passages 24 and 26 respectively, while the upper section 28 of said inlet pipe 22 is countersunk for receiving therein the tapered end 30 of the fluid inlet control valve stem 32.

The upper section 34 of said valve stem 32 is partially threaded as at 36 which is fitted within a threaded bushing 38, one end of which is screwed within the valve boss 40 while its upper end 42 is provided with a threaded shank 44 adapted to receive thereon the cap member 46 which is for holding the packing 48 in place and also for guiding the stem extension 50, so that in operation the passage of a desired amount of water or fluid may be controlled into the chamber 52 of the said inlet section 6.

For connecting the inlet control chamber 8 with the chamber 52 of the inlet section 6 said cross-connecting boss 9 is provided with a suitable inter-connecting passage 54 lying parallel to its body structure and forming a short nozzle or a tube, see Fig. 1, the end of which terminates with a seat 56 and the position of said nozzle end is approximately in the center of the fluid discharge nipple 58, which extends downwardly and into the discharge pipe 12.

In order to control the fluid passage through said passage 54, a suitable control plug 60 is provided which is slidably mounted within said inlet control chamber 8, said plug 60 having a pair of packing rings 62 and having its end section 64 adjacent to said seat 56 provided with a suitable abutting disc 66 which may be made of any suitable material, preferably however of rubber, in order to insure the closing of the fluid passage and prevent possible leaks, while the opposite end of said plug 60 is controlled by a lever member 68 which is hingedly mounted on a bracket 70.

As shown in Figs. 1 and 2, the accumulating chamber 10 partially surrounds the inlet control chamber 8 forming passages 72 and 74, which in area corresponds to the area of the inlet tube 14 or the inter-connecting passage 54, or the outlet area of the nipple 58 and not less, said accummulating chamber 10 extending upwardly, over and above inlet control chamber 8 and having a recessed section 76 which terminates with an internally threaded collar 78 and is adapted to receive therein a dust cap 80.

Said dust cap 80 may, if so desired, be made in any desired shape or configuration, having at its side a plurality of air passages 82 while the screwed-in section forms a seat 84, adapted for controlling the air passage therethrough by means of a disc member 86 mounted upon a stem 88 and held in place by means of a screw member 90 as shown, said stem 88 raising by the fluid pressure passing through the passage 92 causes said disc 86 to close against the seat 84 but allows the air to pass by said seat 84 and the rim edge 94 when the fluid pressure subsides.

It may be noted, that the inlet control chamber 8 at its close proximity to the wall 96 of said chamber 10, preferably at the passage 74, see Fig. 2, is provided with a fluid discharge orifice 98 which points directly into the passage 100 which is provided with a boss and to which a refill tube 102 is connected, which will allow the fluid at a lesser volume to be discharged therefrom and which will also prevent a siphonic action of said fluid therein in the event and when the inter-connecting passage 54 is open.

The discharge pipe 12 is adjustably mounted within the boss member 104, the end of which as at 106 may be positioned in suitable proximity to the end 108 of the discharge nipple 58, and it may be noted, that when the passage 109, or the center positions of the discharge nipple 58 and the discharge pipe 12 are set at a desired distance, a control of the flow of fluids from said discharge nipple 58 and into the accumulating chamber 10 may be had, while said discharge pipe 12 at its nearly upper end 106, is provided with a plug member 111 which is provided with an off-center fluid passage 110, so that when the water passes from the inlet chamber 52 by the seat 56 and emerges through the off-center position of passage 110, it will cause the water to bear upon the surface 112 and overflow over the pipe edge 114 causing the accumulating chamber 10 to fill and cushion and silence the noise of the passing water, particularly when water is forced therethrough at high pressure, and, for controlling the volume of water accumulated within said accumulating chamber 10 said discharge pipe 12 together with the plug 111 may be turned into any desired position and for increasing or decreasing the accumulation of water therein, as the case might be, and further, for adjusting the position of the said plug 111 the external surface of said discharge pipe 12 is provided with a suitable controlling wing nut 116 which may, if so desired, be used for locking said discharge pipe 12 in place by clamping against the boss member 104.

In the Fig. 4 is shown the inlet control chamber 8 and the discharge nipple 58 which leads into the discharge pipe 12, having a pair of air passages 118 leading into the discharge chamber 120 and through the passages 122 which in operation will prevent any siphonic action of the water passing therethrough and into the discharge pipe 12, also, in order to prevent the dust, lint or any other foreign matter, from contaminating the passing water, a suitable dust cap 124 is mounted thereover and upon the boss 126 and is held thereon and in place by means of a spring ring 128 and which when in position provides a circular air passage 130 as shown.

Internally and between the dust cap 124 and the top openings 132 of the air passages 118, said boss 126 is provided with a pair of side passages 134 which are provided with a pair of tubes 136 the ends of which are bent inwardly for allowing the tube passages 138 to lead directly into the openings 132 and the passages 118.

Said passages 134 are inter-connected with a central passage 140 which leads from the inlet chamber 8 and is closed by means of the valve stem 142 the upper end of which is threaded as at 144 and adjustably mounted within a correspondingly threaded socket, as shown, having its end 146 provided with a jam nut 148 for holding it in place after proper adjustment of the tapered tip 150 for controlling the passage 140 has been made and thereby allowing a certain amount of the fluid to pass therethrough and into the discharge chamber 120.

Said discharge chamber 120 is also provided with a suitable ledge 152 which surrounds the center passage 122 and has a side outlet passage 154 connected to the refill tube 102, so that the accumulated fluid passing out of said pair of tubes 136 will cause a portion of the fluid to flow into the refill tube and at the same time, particularly when the inlet chamber 8 is open, will prevent siphoning of the fluid into the inlet pipe (not shown) and therefore prevent the polution of the water therein.

In Fig. 5 I have shown the anti-siphonic valve in modified form comprising a top half housing 156 which is attached to the bottom half housing 158 by means of screws 160 having therebetween a suitable gasket 162.

Said bottom half housing 158 is provided with a circular ledge 164 upon which rests the plate 166 the center section of which is provided with a tubular extension 168 extending upwardly and having a tubular extension 170 extending downwardly, as shown.

Said plate 166 is provided with a plurality of air holes 172 which connects the bottom chamber 174 and the upper chamber 176 when said housings 156 and 158 are in place, and having the mid-section 178 provided with a plurality of holes 180 to inter-connect the chambers formed within the tubular extensions 168 and 170 respectively.

Centrally of said mid-section 178 a suitable tube 182 is provided having the fluid passage 184, which extends upwardly within the chamber of the tubular extension 168 for forming a seat 186 upon which rests a suitable check member 188, having its face at the under section thereof provided with a rubber gasket 190.

Said check member 188 is large enough in diameter to correspond with the inside diameter of the tubular extension 168 having only a slight peripheral passage 192 which allows the fluid to pass therethrough and into the groove 194 for forming a fluidal seal, and said check its center provided with a socket 196 which at its outside is adapted to receive the collar member 198 while at its inside section it receives the tip end 200 of the plunger 202 which has a shank 204 of which the uppermost end 206 is guided by means of the guide boss 208 and may always be in contact with the regulating lever 210 which is fulcrumed upon the fulcrum 212 of a suitable bracket 214 as shown.

Said collar member 198 is slidably mounted upon the said shank 204 and may slide upwardly against the shoulder 216 and by reason of which the circular edge 220 of the resilient member 222 is allowed to abut against the seat 224 closing the gap 226, and thereby preventing the fluid from passing upwardly, until upon subsiding the fluid pressure exerted against the shank member 188 permits said collar member 198 to slide or drop downwardly, exposing the passage or the gap 226 thus allowing the inflow of air to pass through the openings 228 and thereby prevent siphoning of water or other foreign matter into the main inlet pipe and passage 184.

Said inlet passage 184 is supplied with the incoming fluid through the inlet pipe 14 which is enclosed within the fluid outlet pipe 12 held in place by means of the threaded end 230 within the boss 232.

The inlet pipe 14 is threaded at its end as at 234 and fitted within a corresponding thread provided in the bushing extension 236 which is an integral part of the tube member 182 forming a suitable reservoir 238 wherein a pair of stop pins 240 are positioned and adapted to control the upward position of the check valve 242 provided with a tapered head 244 and by its action adapted to seal the top of the inlet pipe 14 in the event of and upon reverse flow and movement of the incoming fluid within said pipe.

When the inflow of fluid in said pipe 14 is established, said control plug 242 is forced by the fluid pressure upwardly allowing the head 244 to bear against the stop pins 240 which movement exposes the passage 248 and the communicating holes 250, so that the fluid may be allowed to pass into the rservoir 238 and into the passage 184.

It may be noted that when the fluid passes out of said inlet pipe 14 and against the control plug 242 and raises it from its sealing position, the water column will pass into the reservoir 238 and through the inlet passage 184 flowing by the seat 186 into the outlet chamber 252, leading downwardly through the passages 180 also into the chamber 174 and the discharge pipe 12 mounted within the boss 232 of the bottom half housing 158.

In the Fig. 6, the anti-siphonic valve shown in another modified form comprises a top half housing 254 which is attached to the bottom half housing 256 by means of screws 258 and having between the flanges thereof a suitable gasket member 260.

The bottom half housing 256 is provided with a bottom boss member 262 which is provided with a central passage or chamber 264 when same is enclosed and the fluid flow is restricted by means of the fluid controls in the inlet pipe 14 and the fluid controlling member 266.

Said fluid inlet pipe 14 is constructed in the same manner as hereinbefore described and shown in Fig. 5, with the exception that the head member 244 of the control plug 242 is provided with the upwardly extending prongs or pins 268 which abut against the bottom section 270 of the fluid controlling member 266.

Said fluid controlling member 266 is provided with a fluid passage 272 leading upwardly and forming a seat 274 which is surrounded by a wall 276 wherein the disc member 278 is positioned and which is supported in place by means of the center rod extension 282 slidably disposed within the hole 284 of the stopper 286 which has a flange 288 holding the cup gasket 290 in place.

Said controlling member 266 at the wall 276 is provided with a side passage 292 which leads outwardly and forms a spout 294 extending downwardly and leading into the discharge pipe 12 disposed within the boss 296 of the bottom half housing 256.

Said cup gasket 290 engages a ledge 298 disposed in the bottom half housing 256 which divides the air chambers 300 and 302, said chamber 300 having a plurality of air holes 304 positioned as shown, so that when said gasket 290 is pressed downwardly the air enters the lower chamber 302 and thereby prevents the siphonic action of fluid in said valve should it attempt to pass backwardly from the discharge pipe 12 into the inlet pipe 14 and consequently preventing the contamination of water therein.

A cup gasket 290 is slidably mounted upon the shank 306 of the plunger 308 which extends upwardly and is guided within the bushing 310 in order to control the position of said disc member 278 and the stopper 286 with its upper end structure 312 adapted to engage a cross-lever 314 which is pivotally attached to the bracket 316 and operable by a lever 318 connected by a link 320, as shown.

While I have thus described my invention with great particularity, it will be clear that the same may be modified throughout a wide range.

I accordingly do not propose to be limited to the exact details of construction herein shown on the drawing and described in the specification, but reserve the right in practice to make the necessary changes and modifications therein which may come within the scope of the appended claim.

I claim as my invention:

In a valve of the class described adapted for preventing siphonic fluid action and for cushioning and silencing the fluid flow therein comprising, a housing, a fluid inlet and outlet means associated with said housing, a fluid passage means inter-connecting said fluid inlet and outlet means, a fluid inlet control chamber means in said housing in communication with said fluid inlet means a fluid control positioned in said control chamber of said housing for controlling the fluid flow from said inlet into said outlet means, an outlet nipple having a passage for inter-connecting said inlet control chamber and said outlet means, said housing providing an accumulating chamber means in communication with said nipple for storing a portion of said fluid passing through said passage of said nipple for cushioning and for silencing the fluid flow therethrough, and air inlet means associated with said housing for permitting air to flow into said accumulating chamber and said outlet means and thereby prevent siphonic action of said valve.

JESSE C. OWENS.